United States Patent
Thomas

(10) Patent No.: US 11,323,024 B2
(45) Date of Patent: May 3, 2022

(54) AC-DC CONVERTER

(71) Applicant: THALES, Courbevoie (FR)

(72) Inventor: Philippe Claude Thomas, Plougonvelin (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/250,177

(22) PCT Filed: Jun. 11, 2019

(86) PCT No.: PCT/EP2019/065250
§ 371 (c)(1),
(2) Date: Dec. 8, 2020

(87) PCT Pub. No.: WO2019/238707
PCT Pub. Date: Dec. 19, 2019

(65) Prior Publication Data
US 2021/0194353 A1 Jun. 24, 2021

(30) Foreign Application Priority Data
Jun. 14, 2018 (FR) ........................................ 1800611

(51) Int. Cl.
*H02M 1/42* (2007.01)
*H02M 1/36* (2007.01)
*H02M 7/217* (2006.01)

(52) U.S. Cl.
CPC ........... *H02M 1/4216* (2013.01); *H02M 1/36* (2013.01); *H02M 1/4241* (2013.01); *H02M 7/2173* (2013.01); *H02M 1/4291* (2021.05)

(58) Field of Classification Search
CPC .... H02M 1/4216; H02M 1/36; H02M 1/4241; H02M 7/2173; H02M 1/4291;
(Continued)

(56) References Cited

U.S. PATENT DOCUMENTS

| | | | |
|---|---|---|---|
| 9,276,413 B1* | 3/2016 | Zhang | H02J 50/12 |
| 2010/0259240 A1 | 10/2010 | Cuk | |
| 2018/0109172 A1* | 4/2018 | Hsu | H02M 1/34 |

FOREIGN PATENT DOCUMENTS

CN  101 860 192 A  10/2010

OTHER PUBLICATIONS

Qiao, et a., "Three-phase unity-power-factor VIENNA rectifier with unified constant-frequency integration control", 7th IEEE International Power Electronics Congress, Technical Proceedings, CIEP, pp. 125-130, Oct. 15, 2000.
(Continued)

*Primary Examiner* — Adolf D Berhane
(74) *Attorney, Agent, or Firm* — BakerHostetler

(57) ABSTRACT

A switched-mode AC-DC converter intended to deliver a DC output voltage $V_{out}$ between a first output terminal and a second output terminal, the converter comprising at least one conversion chain intended to convert an AC input voltage applied between an input terminal and a neutral point, the conversion chain comprising: a first output capacitor comprising one terminal connected to the first output terminal and another terminal connected to a second terminal of the input switch, a second output capacitor with the same capacitance as the first output capacitor and with a higher capacitance than the capacitance of the link capacitor, the second output capacitor comprising one terminal connected to the second output terminal and another terminal connected to the second terminal of the input switch.

14 Claims, 5 Drawing Sheets

(58) Field of Classification Search
CPC ...... H02M 1/4208; H02M 1/42; H02M 1/425; H02M 7/523; H02M 7/217; H02M 7/797
See application file for complete search history.

(56) References Cited

OTHER PUBLICATIONS

Cruz, et al., "A passive lossless snubber for the high power factor unidirectional three-phase three-level rectifier", IECON'99, Conference Proceedings, 25th Annual Conference of the IEEE Industrial Electronics Society, pp. 909-914, Nov. 29, 1999.

Pathak, et al., "3-Phase Power Factor Correction, Using Vienna Rectifier Approach and Modular Construction for Improved Overall Performance, Efficiency and Reliability ", 2003 Power Electronics Conference, IXAN0001, 2003.

* cited by examiner

AC-DC CONVERTER

CROSS-REFERENCE TO RELATED APPLICATIONS

This application is a National Stage of International patent application PCT/EP2019/065250, filed on Jun. 11, 2019, which claims priority to foreign French patent application No. FR 1800611, filed on Jun. 14, 2018, the disclosures of which are incorporated by reference in their entirety.

FIELD OF THE INVENTION

The field of the invention is that of power electronics. More particularly, it concerns the switched-mode conversion of electronic energy.

BACKGROUND

The invention relates to switched-mode AC-DC converters, that is to say to alternating current-direct current converters or rectifiers, of the type that can be used as power factor correctors (PFCs). This type of converter makes it possible to guarantee a lower harmonic level, mass and volume than autotransformer rectifiers, referred to as ATRUs (autotransformer rectifier unit), or than transformer rectifiers (TRUs—transformer rectifier unit). Switched-mode converters used as PFCs allow a high power factor and a very low harmonic content to be guaranteed.

Solutions implemented at present are most often made up of two conversion stages, a PFC stage itself, unisolated and boosting, and a DC-DC buck converter stage, which is most often isolated. Generally, with three phases, the system is composed of 3 isolated single-phase conversion chains wired up in a "triangle" or in a "star" on the three-phase AC bus and interconnected in parallel on the DC output bus. Naturally three-phase conversion systems (full bridge of boost type) do not afford a very high level of performance.

An example of an AC-DC converter lacking a diode bridge at the input and able to be used as a PFC is disclosed in US patent application 20100259240. This converter is intended for single-phase applications.

As can be seen in FIG. 1, this converter comprises, for an input voltage $V_{AC}$ applied between an input terminal and a common terminal:
- an input inductor L1 comprising a first terminal connected to the input terminal and a second terminal connected to a controllable, two-way voltage, input switch $S_{VB}$, which is also connected to the common terminal,
- a branch connected to the second terminal of the input inductor L1 and comprising, in series, an input capacitor Cr and a resonant inductor $L_r$, the value of which is much lower than that of the input inductor L1,
- a first output diode $C_{R1}$ comprising an anode connected to the common terminal and a cathode connected to the resonant inductor Lr,
- a second output diode $C_{R2}$ comprising a cathode connected to an output terminal of the converter and an anode connected to the resonant inductor Lr.

The converter is capable of delivering a DC voltage $V_S$ between the common terminal and the output terminal of the converter, which are connected to an output capacitor Co. The output voltage $V_S$ feeds a load R. This voltage $V_S$ is controlled by altering the duty cycle of the control of the input switch $S_{VB}$.

This converter lacking a diode bridge at the input allows a voltage with the same sign to be delivered at the output, both for a positive input voltage and for a negative input voltage.

One problem with this topology is the volume of the output capacitor.

SUMMARY OF THE INVENTION

It is an aim of the invention to propose a topology allowing the aforementioned problem to be limited.

To this end, the subject of the invention is a switched-mode AC-DC converter intended to deliver a DC output voltage $V_{out}$ between a first output terminal B1 and a second output terminal B2, said converter comprising at least one conversion chain intended to convert an AC input voltage applied between an input terminal E and a neutral point N, the conversion chain comprising:
- an input inductor L comprising a first terminal of the input inductor connected to the input terminal E and a second terminal of the input inductor,
- an input switch S comprising a first terminal connected to the second terminal of the input inductor L, the input switch S being a controllable two-way voltage and current switch,
- an LC circuit comprising a first terminal connected to the second terminal of the input inductor L and a second terminal connected to an intermediate point PI, the LC circuit comprising, between its first terminal and its second terminal, a resonant inductor $L_C$ with a value lower than that of the input inductor L, and a link capacitor C connected in series with the resonant inductor $L_C$,
- a first output switch D1 comprising a first terminal connected to the first output terminal B1 and a second terminal connected to the intermediate point PI, allowing the current to flow solely from the intermediate point PI to the first output terminal B1,
- a second output switch D2 comprising a first terminal connected to the second output terminal B2 and a second terminal connected to the intermediate point PI, the second switch allowing the current to flow solely from the second terminal B2 to the intermediate point, the converter moreover comprising:
- a first output capacitor $C_1$ comprising one terminal connected to the first output terminal B1 and another terminal connected to a second terminal of the input switch S,
- a second output capacitor $C_2$ with the same capacitance as the first output capacitor $C_1$ and with a higher capacitance than the capacitance of the link capacitor C, the second output capacitor $C_2$ comprising one terminal connected to the second output terminal B2 and another terminal connected to the second terminal of the input switch S.

The converter according to the invention advantageously comprises at least one of the following features taken alone or in combination:
- the converter is intended to transform a polyphase voltage comprising multiple phases into a DC voltage, said converter comprising multiple identical conversion chains, each conversion chain receiving one of the phases on its input terminal,
- the second terminal of the input switch is not connected to the neutral point,
- the converter comprises control means configured to control the input switch S so that the conversion chain operates as a buck converter during a start-up phase of the converter, the converter comprises control means configured to control the input switch S so that, during a start-up phase of the converter, the output voltage Vout is a monotonic increasing function of time and meets a setpoint voltage while passing through a nonzero intermediate output voltage lower than the setpoint voltage, then, in order to control the converter, during a steady-state phase, beginning when the output voltage reaches the setpoint voltage, so as to keep the output voltage substantially fixed at the setpoint voltage for a nonzero duration, the control means are configured so that the start-up phase of the converter comprises a phase of increasing the output voltage $V_{out}$ of the converter with a DC derivative from an initial voltage to the setpoint voltage, the input inductor is connected to the input terminal via a low-pass filter, the resonant inductor has a magnetic circuit with a cut-off frequency of lower than 10 MHz, the output capacitors have a capacitance at least one hundred times higher than the capacitance of the link capacitor and the input inductor has an inductance value at least one thousand times higher than the inductance value of the resonant inductor.

The invention also relates to a method for controlling an AC-DC converter according to the invention. This method comprises a step of starting up the converter, during which the input switch S is controlled so that the conversion chain operates as a buck converter.

The method advantageously comprises at least one of the following features taken alone or in combination:

the method comprises a phase of starting up the converter beginning with start-up of the converter, during which the input switch S is controlled so that the output voltage $V_{out}$ is a monotonic increasing function of time and meets a setpoint voltage while passing through a nonzero intermediate output voltage lower than the setpoint voltage, the method comprising a steady-state phase, beginning when the output voltage reaches the setpoint voltage, during which the switch is controlled so as to keep the output voltage substantially fixed at the setpoint voltage for a nonzero duration, the start-up phase comprises a phase of increasing the output voltage Vout of the converter with a DC derivative from an initial voltage to the setpoint voltage, the conversion chain operates as a boost converter during a steady-state phase subsequent to the start-up phase.

BRIEF DESCRIPTION OF THE DRAWINGS

Other features and advantages of the invention will become apparent on reading the detailed description that follows, which is provided by way of nonlimiting example and with reference to the appended drawings, in which.

Throughout the figures, the same elements are referenced using the same reference signs.

DETAILED DESCRIPTION

Figure 1:
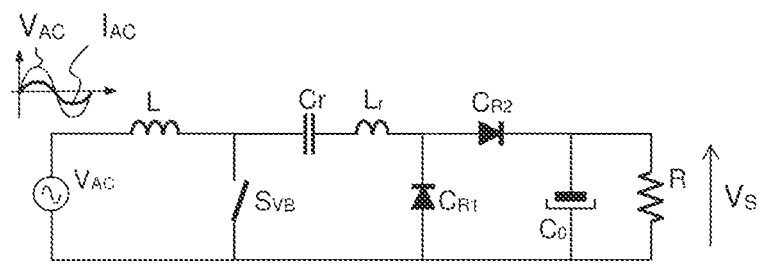
FIG. 1, already described, shows a circuit diagram of a converter from the prior art, FIG. 2 schematically shows an electrical system comprising a single-phase AC-DC converter, FIG. 3 schematically shows the conversion chain of the converter from FIG. 2, FIG. 4 schematically shows a conversion assembly of a converter intended to convert a three-phase voltage into a DC voltage.
Figure 2:
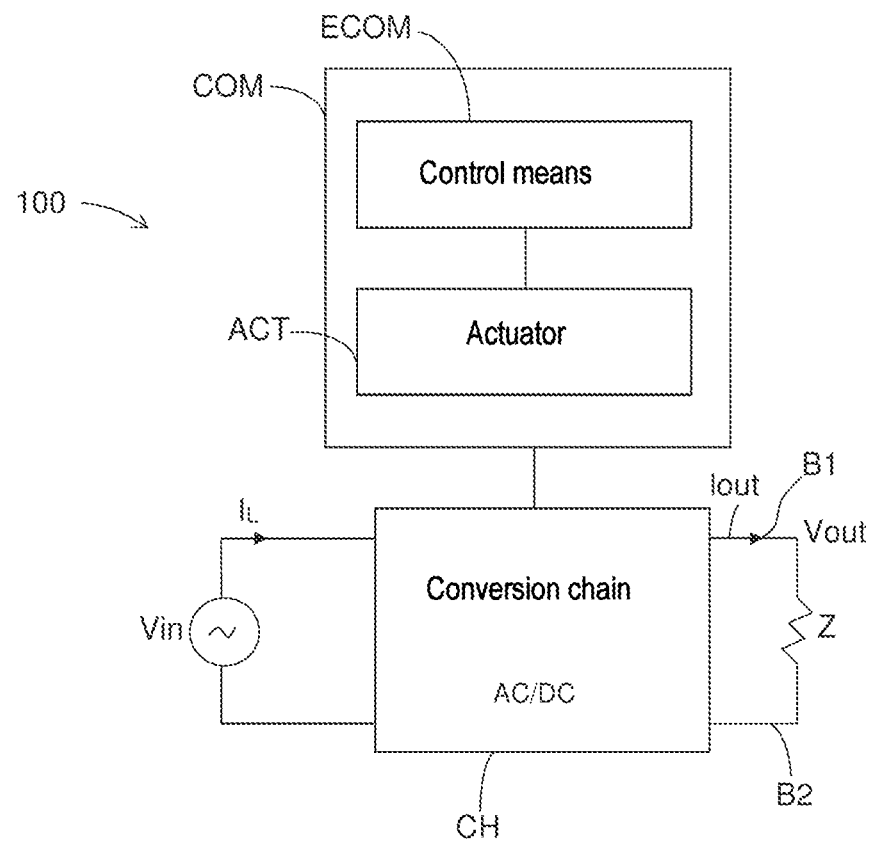

The invention relates to a switched-mode AC-DC converter of the type without a diode bridge at the input and capable of being used as a power factor correction circuit or PFC converter (power factor corrector). As shown in FIG. 2, the converter 100 comprises an AC-DC conversion chain intended to have its input connected directly to a line delivering an AC voltage $V_{in}$ and to deliver a DC voltage $V_{out}$ between two output terminals B1 and B2 of the converter 100. The current $I_{out}$ delivered by the converter 100 feeds a load Z, which may or may not be purely resistive.

Figure 3:
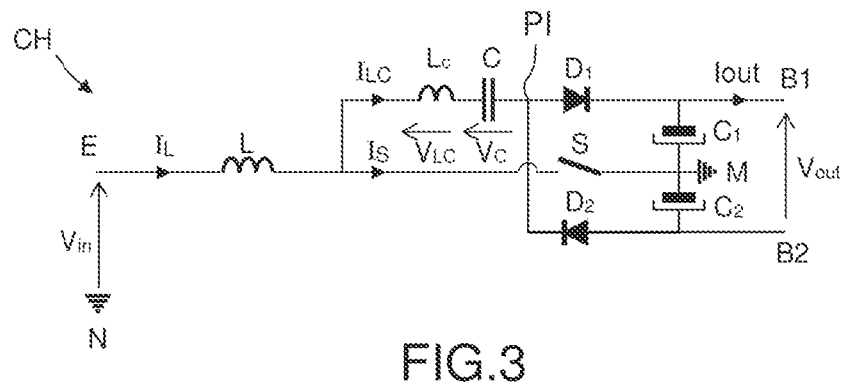

FIG. 3 shows an example of a conversion chain CH intended to convert the AC input voltage $V_{in}$ applied between an input terminal E and a neutral point N into a DC voltage $V_{out}$ delivered between the first output terminal B1 and the second output terminal B2 of the converter. The conversion chain CH comprises:

an input inductor L comprising a first terminal of the input inductor connected to the input terminal E and a second terminal of the input inductor, an input switch S comprising a first terminal connected to the second terminal of the input inductor L, the input switch S being a controllable two-way voltage and current switch, an LC circuit comprising a first terminal connected to the second terminal of the input inductor L and a second terminal connected to an intermediate point PI, the LC circuit comprising, between its first terminal and its second terminal, a resonant inductor $L_C$ with a value lower than that of the input inductor L, and a capacitor C, referred to as a link capacitor, connected in series with the resonant inductor $L_C$, a first output switch $D_1$, comprising a first terminal connected to the first output terminal B1 and a second terminal connected to the intermediate point PI, configured to allow the current to flow solely from the intermediate point PI to the first output terminal B1, in the example in FIG. 3, the first output switch $D_1$ is a diode comprising a cathode connected to the first output terminal B1 and an anode connected to the intermediate point PI, a second output switch $D_2$ comprising a first terminal connected to the second output terminal B2 and a second terminal connected to the intermediate point PI, the second switch being configured to allow the current to flow solely from the second terminal B2 to the intermediate point; in the example in FIG. 3, the second output switch $D_2$ is a diode comprising an anode connected to the second output terminal B2 and a cathode connected to the intermediate point PI.

According to the invention, the converter 100 moreover comprises:

a first output capacitor $C_1$ comprising one terminal connected to the first output terminal B1 and another terminal connected to a second terminal of the input switch S, a second output capacitor $C_2$ with the same capacitance c2 as the first output capacitor $C_1$ (with capacitance c1) and with a higher capacitance c2 than the capacitance c of the link capacitor C, the second output capacitor $C_2$ comprising one terminal connected to the second output terminal B2 and another terminal connected to the second terminal of the input switch S.

The output capacitors $C_1$, $C_2$ may be biased, that is to say may each comprise a positive terminal and a negative terminal, but this is not obligatory. In the case in FIG. 3, in which the capacitors are biased, the positive terminal of the first output capacitor $C_1$ is connected to the first output terminal B1 and its negative terminal is connected to the positive terminal of the second output capacitor $C_2$ and to the second terminal of the input switch S, the positive terminal of the second output capacitor $C_2$ being connected to the second output terminal B2.

The output capacitors have a capacitance at least one hundred times higher than the capacitance of the link capacitor and preferably at least one thousand times higher. (c1≥1000*c and c2=c1).

Equally, the input inductor L has an inductance value l at least one thousand times higher than the value lc of the inductor Lc. In other words, l≥1000*lc.

The input switch S is a controllable two-way voltage and current switch. In other words, this input switch S is capable, in an open state, of blocking a current irrespective of the polarity of the voltage at its terminals and, in a closed state, of conducting the current in both directions from its first terminal to its second terminal and from its second terminal to its first terminal. Such a switch comprises, by way of example, two transistors connected in series with a common source. These transistors may be insulated gate bipolar transistors (IGBTs) or field effect transistors (FETs), such as for example N-type insulated gate field effect transistors or MOSFETs (metal oxide semiconductor field effect transistor).

As a variant of the implementation in FIG. 3, at least one of the output switches $D_1$, $D_2$ is a switch controlled so as to obtain allow the current to flow solely in one direction.

Advantageously, at least one output switch comprises a controlled switch connected to B1 or B2 and to Pl. This controlled switch is controlled so as to allow the current to flow solely in the desired direction. To this end, the switch comprises control means configured to control the output switch so that the latter allows the current to flow solely in the desired direction. This solution is more complex than using diodes but is beneficial in the realm of high powers. By way of example, the switch can comprise a thyristor or an insulated gate field effect transistor, more commonly called a MOSFET (metal oxide semiconductor field effect transistor), with synchronous rectification.

The converter 100 also comprises, as shown in FIG. 2, control means COM capable of controlling the input switch S visible in FIG. 3. These control means COM comprise control-establishing means ECOM for generating a control with duty cycle d and actuating means ACT comprising at least one actuator for actuating the input switch S. In other words, the actuator is actuated by the control-establishing means ECOM so as to actuate the input switch S so that, in each chopping period T, the input switch S is closed from the time 0 to the time d*T and open from the time d*T to the time T. The input switch S is then open, in each chopping period, for a duration d'*T, where d'=1−d.

The open or closed state of the input switch S affects the blocking or conduction of the current through each of the two output switches, $D_1$ and $D_2$, of the conversion chain. $D_1$, $D_2$ are configured and arranged (in the case of the diodes) or able to be controlled to block or conduct the current on the basis of the polarity of the voltage at the input of the conversion chain so that a DC current with the same polarity is obtained at the output of the conversion chain irrespective of the polarity of the voltage at the input of the conversion chain.

The ratio between the maximum input voltage (peak of the AC voltage) and the output voltage $V_{out}$ is dependent on the duty cycle of the input switch S.

The resonant inductor Lc and the link capacitor C form an LC resonant circuit when the input switch S is closed, irrespective of the polarity of the input current. This resonant circuit is active only during a resonant half-cycle, on closure of the switch S. The resonant period Tr of the LC circuit is given by the following formula:

$$Tr=2*\pi*\sqrt{Lc*C}$$

The topology in FIG. 3 allows a voltage with the same sign to be delivered at the output, said voltage being adjustable irrespective of the sign of the input voltage $V_{in}$.

Owing to the arrangement of the output capacitors according to the invention, the conversion chains, when they are controlled to operate as boost converters, provide low boost. They provide half the boost of Vienna bridge topologies of the type described in the article "3-Phase Power Factor Correction, Using Vienna Rectifier Approach and Modular Construction for Improved Overall Performance, Efficiency and Reliability", Mr. Abhijit D. Pathak, et al. Indeed, as we will see subsequently, $V_{out}=V_{inc}/(1-d)$ where $V_{inc}$ is the peak value of the AC input voltage $V_{in}$. The link capacitor C of the LC circuit charges to $\pm V_{out}/2$ (according to the sign of $V_{in}$). This low-boost solution can allow a voltage lowering stage to be dispensed with according to the desired output voltage.

The presence of a single two-way voltage and current input switch, the absence of an input rectifier bridge (full diode bridge at the input) and the simplicity of the topology allow a high level of integration and high conversion performance to be achieved.

When the converter is used as a PFC, the input switch is controlled so that the current drawn $I_L$ at the input is proportional and in phase with the input voltage $V_{in}$. This allows a low harmonic level and therefore a high power factor to be obtained.

In a polyphase system, as the capacitances of the output capacitors $C_1$ and $C_2$ are identical or substantially identical, the M point, that is to say the link point between the two output capacitors $C_1$ and $C_2$ or midpoint, is a false neutral with the same potential as the neutral point N of the input network.

The invention, then, is especially useful for vehicles (jumbo jets, fighter aircraft, surface ships, submarines, surface or submarine drones, etc.) in which the neutral of the onboard generating system (or onboard electrical system) is not distributed or in which it is not possible to draw current from the neutral. Another advantage concerns safety. The reason is that a fault between one phase and the neutral translates into an overcurrent that it is easy to detect in order to protect the network. The proposed topology allows connection to the mechanical mass to be prevented. One advantage of this configuration is that it prevents certain harmonics from circulating on the network. By way of example, in the case of a three-phase network, the 3rd harmonic easily travels on the aircraft neutral. Another advantage of this configuration is that it prevents protective measures from being triggered in the event of a simple fault between one phase and the shell, thus allowing continuous service even in the event of a fault.

The M point and the neutral point may or may not be connected, depending on the desired advantages.

Another aim is to propose an AC/DC converter intended to receive a polyphase voltage at the input, allowing it to be used in higher power applications.

A variant is therefore proposed in which the converter is intended to convert a polyphase voltage conveyed by a polyphase line into a DC voltage delivered between the two output terminals of the converter. The converter then comprises a conversion assembly comprising multiple conversion chains, each transforming an AC voltage, corresponding to one of the phases of the polyphase line, that is applied between the two input terminals of this conversion chain into a DC voltage delivered between the two output terminals B1 and B2 of the converter.

Figure 4:
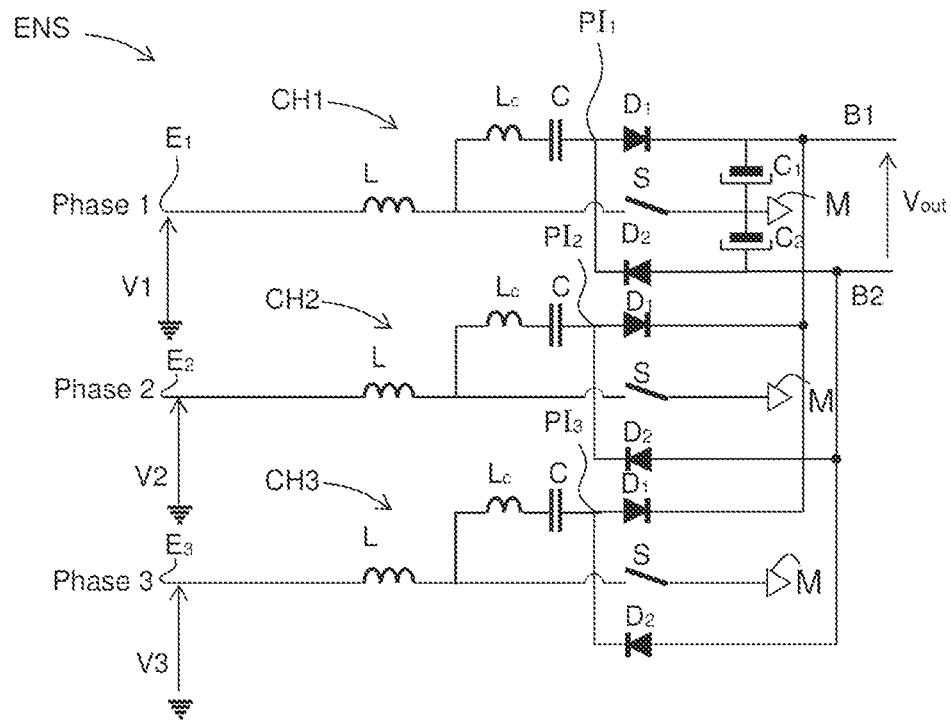

Such a conversion assembly ENS is shown in FIG. 4. This conversion assembly ENS comprises multiple identical conversion chains CH1, CH2, CH3. Each of these chains is identical to the conversion chain in FIG. 3. These chains are connected to the output capacitors $C_1$ and $C_2$ of the conversion assembly ENS, that is to say of the converter, in the same way as the chain CH. The different conversion chains are connected to different phases of the polyphase line (phases 1, 2 and 3 in FIG. 4) and subjected, at their respective input terminals $E_1$, $E_2$, $E_3$, to respective voltages V1, V2, V3 corresponding to the voltages of the respective phases of the polyphase line. The number of conversion chains is equal to the number of phases of the network of the input voltage. FIG. 4 illustrates a nonlimiting example of a power converter comprising three conversion chains that is intended to be connected to a three-phase input network, but the number of phases of the polyphase input line and hence the number of conversion chains could be different. Each of these chains comprises an intermediate point PI1, PI2, PI3 in the chain.

As the phases are balanced (the network delivering phases with the same amplitude and with the same frequency but phase-shifted) and as the conversion chains are all identical, the current absorbed on the different phases is the same (apart from the phase shift between the phases). The M point is therefore a false neutral with the same potential as the neutral N of the input network, even if the latter is not distributed, that is to say even if these M and N points are not connected to one another.

Figure 5A:
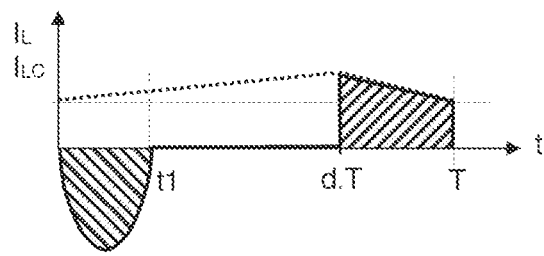
FIGS. 5a and 5b show the appearances of the currents and voltage in the conversion chain from FIG. 3 as a function of time.
Figure 5B:
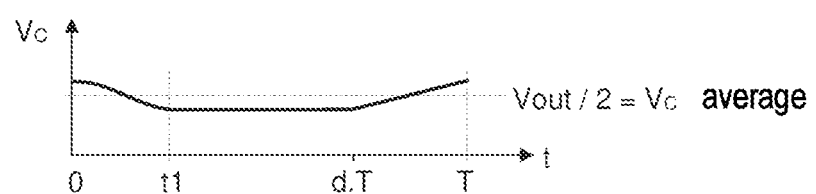

We will now describe the operation of the conversion chains CH with reference to FIG. 3 and to FIGS. 5*a* and 5*b*.

The value of the input inductor L is much higher than that of the resonant inductor $L_c$ and the capacitance of the input capacitor is low in comparison with the capacitance of each of the capacitors $C_1$ and $C_2$, the capacitors $C_1$ and $C_2$ having an identical capacitance.

The chopping period T is much shorter than the period of the AC input voltage $V_{in}$.

The analysis involves chopping the chopping period into three phases of operation. The input switch S, the inductive and capacitive components are considered to be perfect in this instance.

The operation is described during a positive cycle of the input voltage. During a negative cycle, the currents are reversed and the roles of the diodes $D_1$ and $D_2$ are also swapped ($D_1$ is used to reverse the charge of C and $D_2$ is on for a duration of $(1-d)*T$).

A phase referred to as a steady-state phase is taken, during which the switch S is controlled so that $V_{out}$ is fixed (steady-state output voltage), and a chopping period during which the input voltage $V_{in}$ can be considered constant (because the evolution of the voltage $V_{in}$ is slow in comparison with a chopping period) is considered.

The operation is the same for each of the chains in FIG. 4.

Phase 1

The initial time t=0 corresponds to the beginning of the chopping period T.

The input switch S is closed from 0 to t1, which turns off the diode $D_2$. As can be seen in FIG. 5*b*, the voltage $V_C$ on the terminals of C decreases through resonance between $L_c$ and C until the current in the diode $D_2$ is cancelled out, said diode naturally turning off while S remains closed.

The current $I_S$ is the current flowing in the input switch S to the midpoint M. The current $I_{LC}$ is the current absorbed by the LC circuit. The current $I_L$ is the current absorbed by the conversion chain:

At any time $I_S(t)=-I_{LC}(t)+I_L(t)$ $$I_L(t)=V_{in}*t/L+I_L(t=0)$$

$I_L$ (t) increases as shown in dotted lines in FIG. 5*a*.

$$V_{LC}(t)=V_{out}/2+(V_C(t=0)-V_{out}/2)*\cos(\omega*t)$$

where $\omega=1/\sqrt{L_c*C}$

D2 turns off at the time t1:

$$t1=\pi*\sqrt{L_c*C}$$

$I_{LC}(t)=(V_C(t=0)-V_{out}/2)/\sqrt{(L_c*C)}* \sin(\omega*t)$ which holds only if $V_C(t=0)$ is greater than $V_{out}/2$. Thus, the absolute value of $I_{LC}$ (t) increases until the diode turns off, and then decreases up until t1, as can be seen in solid lines in FIG. 5*a*.

Phase 2

The input switch S is still closed but $D_2$ is off from t1 to d*T, where T is the chopping period (T=1/F, where F is the chopping frequency).

As can be seen in FIG. 5*a*:

At t1, $I_{LC}=0$ as can be seen in FIG. 3, $I_{out}=0$ and $I_S(t)=I_L(t)$ $I_L(t)=V_{in}*t/L+I_L(t=t1)$ the loading of the inductor L is linear as can be seen in FIG. 5*a*.

Phase 3

The switch S is open at the time t2=d*T and remains so until the end of the chopping period T.

During this third phase, some of the energy stored in L is returned to C and to C1. This duration (T−d*T) is very short in comparison with the period of the resonant frequency of the LC circuit. We are again working around $\omega*t=\pi/2$, where $\omega=1/\sqrt{(L_c+L)*C}$. The appearance of the current $I_L$ is quasi-linear as can be seen in FIG. 5*a*.

During the third phase, it is therefore possible to write the following: $I_L(t)=I_{LC(t)}$.

$$I_L(t)=(V_{in}-V_{out}/2)/\sqrt{(L_c+L)*C}* \sin(\omega*t)+I_L(t=d*T)$$

The discharge of current from the input inductor L is quasi-linear and the current $I_L(t)$ in L decreases, while C charges with voltage and $V_C$ (t) increases quasi-linearly as can be seen in FIG. 5*b*.

It will be noted that in order for the average charge of the link capacitor C, that is to say average $V_c$, to be constant, there is a need for equality between the energy removed during phase 1 and that removed during phase 3; this corresponds to an equality between the positive and negative areas of the current $I_{LC}$ that are shown by hatching in FIG. 5*a*.

It can be seen that in each chopping period T the same energy is transferred to the two output capacitors $C_1$ and $C_2$ with the same capacitance, to $C_2$ from t=0 to t1 and to $C_1$ from t=d*T to T. The capacitors are thus charged at the chopping frequency and not at the frequency of the network, which is much lower than the chopping frequency. This configuration allows the storage of energy, and hence the size of the capacitors, to be limited, which allows a high level of integration to be achieved and/or a stable output voltage to be delivered, while limiting ripples in the output voltage (the average voltage is the same at the terminals of the two capacitors during a chopping period). It should be noted that in the case of an assembly of Vienna bridge type as in the article "3-Phase Power Factor Correction, Using Vienna Rectifier Approach and Modular Construction for Improved Overall Performance, Efficiency and Reliability", Mr. Abhijit D. Pathak, et al., one of the output capacitors is charged over the positive cycle of the network and the other capacitor is charged over the negative cycle of the network. In the assembly according to the invention, C1 and C2 are therefore charged at the chopping frequency instead of the frequency of the network.

Determination of the Output Voltage $V_{out}$:

The amplitude of the variation in current $I_L$ is the same between 0 and d*T as between d*T and T in a state during which the current $I_L$ at the beginning of a period is identical to that at the end of a period.

From t=0 to d*T: $\Delta I_L = V_{in} * d * T/L$

From t=d*T to T: $\Delta I_L = (V_{out}/2 + V_c - V_{in})*(1-d)*T/L = (V_{out} - V_{in})*(1-d)*T/L$, where $V_c = V_{out}/2$ From this it is deduced that: $(V_{out} - V_{in})*(1-d) = V_{in}*d$, that is to say: $V_{out} = V_{in}/(1-d)$ This is the equation for a boost converter.

This condition is confirmed if the product d*T is greater than or equal to Tr/2 (Tr being the resonant period of the LC circuit formed by $L_c$ and C), otherwise discharge of the capacitor C is not possible during the chopping period, that is to say between 0 and d*T, and the operation as a boost converter described above cannot take hold.

When d*T is less than Tr/2, then discharge of the capacitor C is not possible between 0 and d*T. The converter then operates as a buck converter.

Thus, boost converter operation is obtained when the control-establishing means ECOM control the input switch S so that the duty cycle d is greater than or equal to Tr/2. The control-establishing means ECOM may moreover be configured so that $V_{out}$ is equal to a predetermined setpoint value $V_{cons}$.

In other words, there can be no resonance for $L_C$ and C and therefore operation as a boost converter while the charge of C ($V_c$) has not joined the value of the voltage $V_{out}/2$ (or the charge of $C_2$).

During regulated boost converter operation, that is to say when the output voltage is fixed, the average voltage Vc on the terminals of C is equal to $V_{out}/2$.

With single-phase or polyphase alternating current, the voltage $V_{in}$ used in the equations given above is the peak value of the simple voltage of the network (between phase and neutral). During boost converter operation, the output voltage $V_{out}$ is therefore always greater than the maximum peak value of the simple voltage between phase and neutral $V_{in}$.

Switching Operations:

When the input switch S closes, the inductors L and Lc oppose the establishment of the current and zero current switching (ZCS) is performed.

The input switch S is not perfect: it has a parasitic capacitance; the opening of this switch then charges its parasitic capacitance. The inductor Lc opposes the establishment of the current to the diode $D_1$. There follows an oscillating state or switching noise owing to the resonance of the parasitic capacitance of the input switch S with the inductor Lc, which can cause overvoltages on the terminals of the input switch S. The frequency of the oscillations may be very high (>10 MHz).

In order to limit the amplitude and duration of the switching noise owing to the input switch being off, the inductor Lc can be configured so that its magnetic circuit dissipates at least some of the energy of the switching noise so as to limit and preferably eliminate the overvoltages when the output switch S is off. To this end, the magnetic circuit of the inductor Lc has a cut-off frequency of lower than 10 MHz. The frequency of the switching noise is typically higher than 10 MHz.

The resonant inductor Lc that contributes to the switching noise comprises a magnetic circuit with a distributed gap, for example. This type of inductor is, by way of example, produced from a material with low magnetic permeability, for example, lower than 100 nH/turn$^2$. The low energy of the switching noise, at a frequency higher than a few MHz, will be dissipated in the magnetic material.

Use as a PFC

At the zero crossing of the voltage $V_c$, the charge of C needs to reverse, which cannot be done instantaneously and may affect the appearance of the absorbed current.

The values of the components Lc and C are advantageously chosen in order to ensure that the voltage Vc on the capacitor C turns over in a sufficiently short time to permit a sufficiently large range of variation of the duty cycle to cope with the dynamic range of input voltage and to limit the current peak $I_S$ flowing in the input switch. This allows a consequent oversizing of the input switch to be limited.

Start-Up

On start-up of the converter, that is to say upon establishment of the input voltage $V_{in}$ on the input terminal, when the output switch S is not controlled, there is a current surge inherent to the switches $D_1$ and $D_2$ (the converter behaves as a rectifier). This current surge is traditionally limited by providing a pre-charge device downstream or upstream of the converter of the type comprising a switch or a contactor that, in the steady state, shorts resistors connected in series with the phases or a power switch (transistor) on the DC bus, which shorts, in the steady state, a resistor connected in series, upstream of the output capacitors. The pre-charge device allows the output capacitors to be charged on start-up of the converter. This type of precharge device is bulky, however.

An advantage of the converter according the invention is that it allows the voltage $V_{out}$ delivered to be regulated to a predetermined value between zero and a value higher than the peak value of the simple voltage, which can allow the current surge on start-up to be limited by integrating the rise in the output voltage over a long time of several AC periods of $V_{in}$. This applies just as well in the single-phase case as in the polyphase case.

The inrush current on start-up is limited by means of appropriate control of the input switch.

In fact, in the absence of chopping, the capacitors C, $C_1$ and $C_2$ are charged to voltage values inversely proportional to their capacitances. Consequently, $V_c$ is almost equal to $V_{in}$ because C has a very low value compared with $C_1$ and $C_2$. The output voltage $V_{out}$ then remains minimal (in the inverse ratio of the values of the capacitances of the capacitors C and $C_1$ or $C_2$) according to the cycle under consideration.

When the converter performs chopping, the link capacitor C can remain charged to an average voltage greater than $V_{out}/2$, if the duty cycle d is regulated so as to prevent its complete discharge during the beginning of the chopping period T; the output voltage $V_{out}$ is then equal to $V_{in}-V_c$ and $V_{out}$ is all the lower the higher $V_c$ is.

This is possible only if the duty cycle d is such that d*T is of a duration shorter than the resonant half-cycle of the LC circuit (C and Lc pair), or * T<π*√($L_c$*C). A very low duty cycle d allows the voltage $V_{out}$ to be limited considerably and a voltage $V_{out}$ of almost zero (more precisely, in the inverse ratio of the values of the capacitances of C1 and C as seen above) to be delivered. It is therefore possible to limit the inrush current on the AC network without using a precharge device, by progressively increasing the duty cycle d*T.

Let DS denote the threshold of duration according to DS=π*√($L_c$*C)=½*Tr
where Tr is the resonant period of the LC circuit formed by $L_c$ and C In summary:

If d tends towards 0 (with d*T<<DS), then the average value of the voltage $V_c$ on the terminals of C tends towards $V_{in}$, the ratio between $V_c$ and $V_{c1}$ (voltage on the terminals of $C_1$) is inversely proportional to the ratio between C and $C_1$ (capacitive divider bridge), the value of C being much lower than that of $C_1$.

If d is such that 0<d*T<DS, then $V_{out}$ is lower than $V_{in}$.

If d is such that d*T>DS, then $V_{out}$ is higher than $V_{in}$.

The control means COM are advantageously configured to control the input switch so that the converter operates as a buck converter on start-up of the converter.

In other words, the control means COM are configured to regulate the value of the duty cycle d so that d*T<DS, on start-up of the converter, that is to say when the converter is powered up.

This control of the input switch allows the discharge of the link capacitor on start-up to be limited, which limits the output voltage $V_{out}$ ($V_{out}$ is then lower than Vc) and the inrush current. The inrush current is limited to the value of the current surge due to the link capacitor C, which has a capacitance c with a value much lower than the capacitance c1 of C1.

In other words, this allows the inrush current to be limited without adding a precharge device in the event of the converter being intended to deliver a fixed setpoint voltage that is such that the converter operates as a boost converter after the start-up phase.

More generally, the control means are advantageously configured to control the input switch S, on start-up of the converter, so that the output voltage $V_{out}$ is a monotonic increasing function of time or strictly monotonic increasing function of time (in other words, its derivative, at each time, is greater than or equal to 0 or greater than 0) and meets a setpoint voltage while passing through a nonzero intermediate output voltage lower than the setpoint voltage, then, in order to control the converter in the steady state, which begins when the output voltage reaches the setpoint voltage, so as to keep the output voltage substantially fixed at the setpoint voltage. This is carried out for a nonzero duration. This duration is typically several periods of the input voltage.

The output voltage is advantageously kept substantially fixed at the setpoint voltage for several periods of the AC input voltage. This step allows the current surge on start-up to be limited. Limitation of the start-up current is permitted whether the converter is intended to operate as a boost converter or as a buck converter in the steady state.

By way of example, the control means are configured to control the input switch S so that the start-up phase of the converter comprises a phase of increasing the output voltage $V_{out}$ of the converter with a DC derivative from an initial voltage to the setpoint voltage. The start-up phase can also comprise an initial phase, beginning with start-up of the converter and preceding the phase of increasing the output voltage, during which the output voltage is kept at the initial voltage for several periods of the AC input voltage. The start-up phase thus comprises an initial phase beginning at t=0 corresponding to the time of start-up, that is to say of powering up the converter, at t=ta, during which the output voltage is kept substantially fixed at the initial voltage for a nonzero duration, preferably for several periods of the AC input voltage, and a phase of increasing output voltage from t=ta to t=tb, during which the output voltage increases with a DC derivative up to the setpoint voltage. In one nonlimiting example, the converter is controlled so that the output voltage is substantially a linear function of time between t=ta and t=tb during the start-up phase. As a variant, the start-up phase comprises only the phase of increasing the voltage. The time ta is then zero.

The steady-state phase begins at the time t=tb. During this phase the output voltage is kept substantially fixed at the setpoint voltage.

The output voltage is advantageously kept substantially fixed at the setpoint voltage for several periods of the AC input voltage.

Advantageously, the initial output voltage is substantially zero. Its absolute value is the minimum absolute value of the output voltage due to the charge of the output capacitors.

As a variant, the initial output voltage comprises an absolute value between the minimum absolute value and the absolute value of the setpoint voltage.

The setpoint voltage is such that the converter operates as a boost converter, for example. As a variant, this setpoint voltage is such that the converter operates as a buck converter.

The invention also relates to a method for controlling the switch or the switches of the converter so as to implement at least one of the steps listed above. The method advantageously comprises a start-up phase as described previously and a steady-state phase as described previously, beginning when the output voltage reaches the setpoint voltage.

Figure 6:
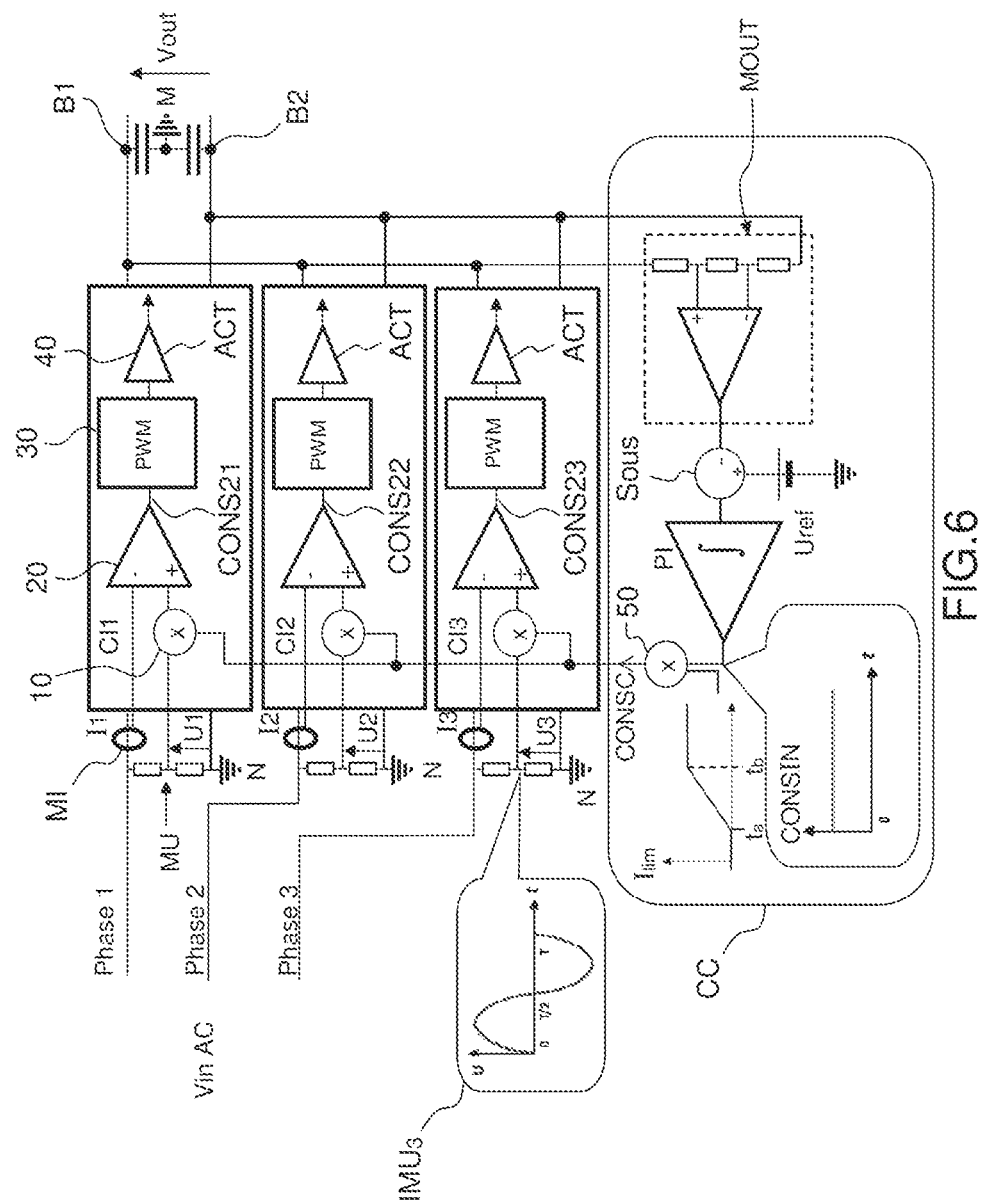
FIG. 6 shows an example of the control means in the case of a converter intended to convert a polyphase voltage into a DC voltage.

FIG. 6 schematically shows a nonlimiting example of the control means in the case of a three-phase converter used as a PFC.

The control means COM comprise a common control chain CC delivering a common current setpoint CONSC established on the basis of a measurement of the output voltage $V_{out}$ of the converter. They also comprise an individual control chain for each phase CI1, CI2, CI3. The individual control chains of the different phases are identical. Only the elements of the individual control chain of the first phase CI1 are referenced to improve clarity. Each individual control chain receives a measurement of the voltage of one of the input phases phase 1, phase 2 or phase 3 and of the current I1, I2 or I3 drawn from that phase. Means for measuring the voltage of the corresponding phase MU and means for measuring MI the current drawn are provided for this purpose. The individual control chain CI1, CI2, CI3 comprises a multiplier 10, multiplying the first common current setpoint CONSC by the measurement of the voltage of the corresponding phase U1, U2 or U3. This multiplication allows a current to be absorbed on the input phase, said current being in phase with the voltage of this phase and proportional to this voltage, and therefore allows this converter to be used in PFC mode (the load seen by the network is comparable to a resistor).

Any other control law used on the Vienna bridge can be implemented on the topology described here as a variant.

For example, in current mode, the measurement of the current I1, I2 or I3 drawn from the phase (phase 1, phase 2 or respectively phase 3) and the output of the multiplier 10 are provided at the input of a comparator 20, which compares the measurement of the current I1, I2 or I3 drawn from the corresponding phase and the output of the multiplier 10 in order to deliver an individual current setpoint CONS21, CONS22, or respectively CONS23. This individual setpoint is provided to a pulse width modulator PWM, 30, which delivers close and open controls for the input switch S of the corresponding conversion chain CH1, CH2 or respectively CH3. These controls are provided to an actuator ACT, 40, which actuates the input switch S of the corresponding chain CH1, CH2 or respectively CH3 on the basis of these controls.

The common control chain CC comprises a digital or analog proportional integrator PI, the cut-off frequency of which is lower than the frequency of the network so that the initial current setpoint CONSIN delivered by the proportional integrator PI varies little during one period of the network.

The proportional integrator PI delivers this initial current setpoint CONSIN on the basis of an output from a subtractor SOUS subtracting a measurement of an output voltage $V_{out}$ of the converter, measured between the output terminals B1 and B2 of the converter by means for measuring this output voltage MOUT, from a fixed reference voltage Uref corresponding to the setpoint voltage.

In a less advantageous variant, the multiplier 10 does not use the input voltage (advantageous mode which allows the converter to be made to behave as a pure resistor), but rather uses the signal from a synchronized phase locked loop (PLL) on the network; the current absorbed on a phase is then purely sinusoidal, irrespective of the appearance of the input voltage (presence of harmonics).

The control means COM are advantageously configured to limit the current surge during the start-up phase of the converter. This start-up phase is followed by the steady-state phase, during which the control means are configured so as to control the input switch S so that the output voltage is substantially fixed and equal to the setpoint voltage. The current surge is thus smaller than the current surge that would be obtained if the steady state began on start-up (the output voltage would be equal to the setpoint voltage on start-up).

To this end, the control-establishing means comprise, for example as shown in FIG. 6, another multiplier 50 for multiplying the initial current setpoint CONSIN by a limiting current Ilim allowing the common current setpoint CONSC delivered to the multipliers 10 of the control chains of the different phases to be limited. The output of the multiplier 50 is then supplied to the multipliers 10. As a variant, the common chain is devoid of the multiplier 50 and the initial current setpoint CONSIN is provided at the input of the multipliers 10.

The limiting current Ilim as a function of time follows the curve shown in FIG. 6, for example. The current is zero between t=0 and t=ta. The current is then a linear function of time between ta and tb, then fixed from tb. The common current setpoint is thus limited between t=0 and tb, allowing the duty cycle d to be limited between 0 and tb and thus allowing the output voltage of the converter and the current surge to be limited.

As a variant, the common setpoint current CONSC is equal to a maximum current Imax between ta and tb greater than the steady-state common setpoint current CONSC and then a zero common setpoint current CONSC when the output voltage reaches the setpoint voltage, allowing faster start-up to be obtained and the current surge to be limited.

Figure 7:
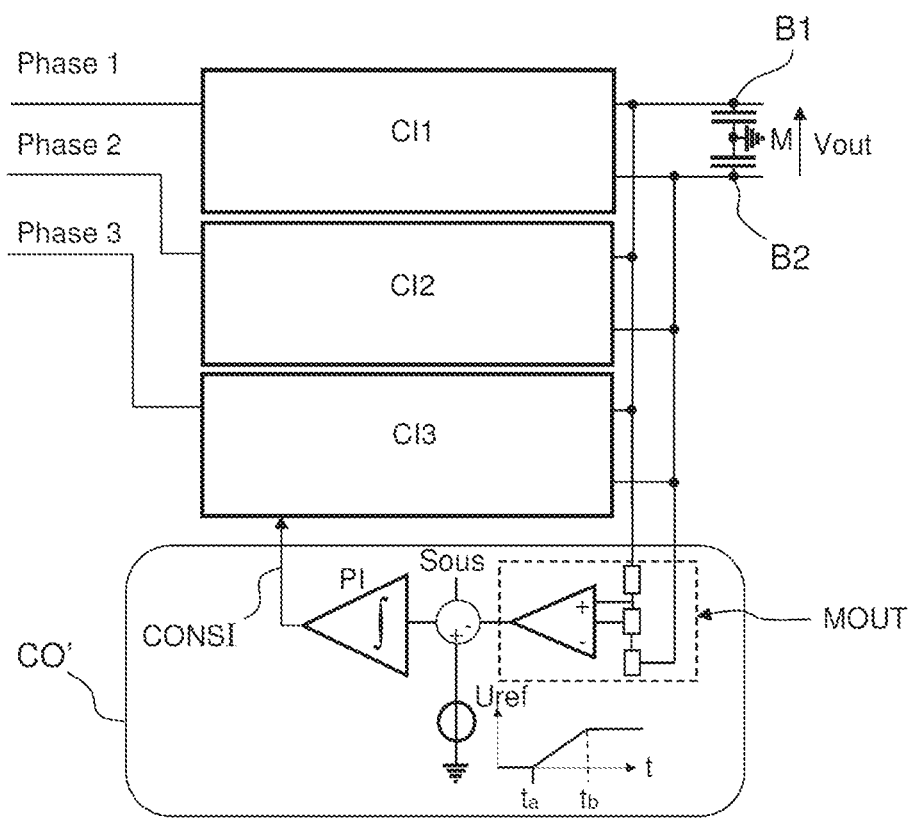
FIG. 7 shows another example of the control means in the case of a converter intended to convert a polyphase voltage into a DC voltage.

As a variant, the reference voltage Uref (t) provided at the input of the subtractor SOUS follows a temporal curve allowing a start-up step as described previously to be performed. The voltage is of the type shown in FIG. 7, for example. The reference voltage Uref is zero from the time t=0 to the time t=ta, and then it follows a linear increasing function of time between ta and tb corresponding to the time of the end of start-up. The reference voltage is then constant from tb. The control means in FIG. 7, different from those in FIG. 6 by virtue of the common control chain CO' devoid of a multiplier 50 and by virtue of the reference voltage provided at the input of the subtractor SOUS.

In FIGS. 3 and 4, the input inductor L is connected directly to the input terminal E of the converter, that is to say to one of the phases of the polyphase line or to the line conveying the single-phase voltage. As a variant, the input inductor is to the input terminal of the converter, that is to say to one of the phases of the polyphase line or to the line conveying the single-phase voltage, via a common-mode and/or differential low-pass filter of the conversion chain.

The invention claimed is:

1. A switched-mode AC-DC converter intended to deliver a DC output voltage $V_{out}$ between a first output terminal (B1) and a second output terminal (B2), said converter comprising at least one conversion chain intended to convert an AC input voltage applied between an input terminal (E) and a neutral point (N), the conversion chain comprising:
    an input inductor (L) comprising a first terminal of the input inductor connected to the input terminal (E) and a second terminal of the input inductor,
    an input switch (S) comprising a first terminal connected to the second terminal of the input inductor (L), the input switch (S) being a controllable two-way voltage and current switch,
    an LC circuit comprising a first terminal connected to the second terminal of the input inductor (L) and a second terminal connected to an intermediate point (PI), the LC circuit comprising, between its first terminal and its second terminal, a resonant inductor (Lc) with a value lower than that of the input inductor (L), and a link capacitor C connected in series with the resonant inductor (Lc),
    a first output switch D1 comprising a first terminal connected to the first output terminal B1 and a second terminal connected to the intermediate point PI, allowing the current to flow solely from the intermediate point PI to the first output terminal B1,
    a second output switch D2 comprising a first terminal connected to the second output terminal B2 and a second terminal connected to the intermediate point PI, the second switch allowing the current to flow solely from the second terminal B2 to the intermediate point,
    the converter moreover comprising:
    a first output capacitor ($C_1$) comprising one terminal connected to the first output terminal (B1) and another terminal connected to a second terminal of the input switch (S),
    a second output capacitor ($C_2$) with the same capacitance as the first output capacitor ($C_1$) and with a higher capacitance than the capacitance of the link capacitor (C), the second output capacitor ($C_2$) comprising one terminal connected to the second output terminal (B2) and another terminal connected to the second terminal of the input switch (S).

2. The AC-DC converter as claimed in claim 1, the converter being intended to transform a polyphase voltage comprising multiple phases into a DC voltage, said converter comprising multiple identical conversion chains, each conversion chain receiving one of the phases on its input terminal.

3. The AC-DC converter as claimed in claim 2, wherein the second terminal of the input switch is not connected to the neutral point.

4. The AC-DC converter as claimed in claim 1, comprising control means (COM) configured to control the input switch (S) so that the conversion chain operates as a buck converter during a start-up phase of the converter.

5. The AC-DC converter as claimed in claim 1, comprising control means configured to control the input switch (S) so that, during a start-up phase of the converter, the output voltage $V_{out}$ is a monotonic increasing function of time and meets a setpoint voltage while passing through a nonzero intermediate output voltage lower than the setpoint voltage, then in order to control the converter, during a steady-state phase, beginning when the output voltage reaches the setpoint voltage, so as to keep the output voltage substantially fixed at the setpoint voltage for a nonzero duration.

6. The AC-DC converter as claimed in claim 5, wherein the control means are configured so that the start-up phase of the converter comprises a phase of increasing the output voltage $V_{out}$ of the converter with a DC derivative from an initial voltage to the setpoint voltage.

7. The AC-DC converter as claimed in claim 1, wherein the input inductor is connected to the input terminal via a low-pass filter.

8. The AC-DC converter as claimed in claim 1, wherein the resonant inductor has a magnetic circuit with a cut-off frequency of lower than 10 MHz.

9. The AC-DC converter as claimed in claim 1, wherein the output capacitors have a capacitance at least one hundred times higher than the capacitance of the link capacitor and the input inductor has an inductance value at least one thousand times higher than the inductance value of the resonant inductor.

10. A method for controlling an AC-DC converter as claimed in claim 1, comprising a step of starting up the converter, during which the input switch (S) is controlled so that the conversion chain operates as a buck converter.

11. A method for controlling an AC-DC converter as claimed in claim 1, the method comprising a phase of starting up the converter beginning with start-up of the converter, during which the input switch (S) is controlled so that the output voltage $V_{out}$ is a monotonic increasing function of time and meets a setpoint voltage while passing through a nonzero intermediate output voltage lower than the setpoint voltage, the method comprising a steady-state phase, beginning when the output voltage reaches the setpoint voltage, during which the switch is controlled so as to keep the output voltage substantially fixed at the setpoint voltage for a nonzero duration.

12. The method for controlling an AC-DC converter as claimed in claim 11, wherein the start-up phase comprises a phase of increasing the output voltage $V_{out}$ of the converter with a DC derivative from an initial voltage to the setpoint voltage.

13. The control method as claimed in claim 11, wherein the conversion chain operates as a boost converter during a steady-state phase subsequent to the start-up phase.

14. The AC-DC converter as claimed in claim 1, wherein said converter is of a type configured to be used as a power factor corrector (PFC).

* * * * *